United States Patent [19]

Gilbert

[11] 4,166,672

[45] Sep. 4, 1979

[54] OPTICAL FIBER CONNECTOR

[75] Inventor: Alan R. Gilbert, Essex, England

[73] Assignee: ITT Industries, Inc., New York, N.Y.

[21] Appl. No.: 817,176

[22] Filed: Jul. 20, 1977

[30] Foreign Application Priority Data

Jul. 27, 1976 [GB] United Kingdom ............... 31229/76

[51] Int. Cl.² .............................................. G02B 5/14
[52] U.S. Cl. ................................ 350/96.20; 350/96.21
[58] Field of Search ................ 350/96.20, 96.21, 96.22

[56] References Cited

U.S. PATENT DOCUMENTS

| 3,914,015 | 10/1975 | McCartney | 350/96.22 |
|---|---|---|---|
| 3,982,815 | 9/1976 | Nakayama | 350/96.22 |

FOREIGN PATENT DOCUMENTS

| 2529352 | 1/1976 | Fed. Rep. of Germany | 350/96.21 |
|---|---|---|---|
| 2710949 | 9/1977 | Fed. Rep. of Germany | 350/96.20 |
| 1448975 | 9/1976 | United Kingdom | 350/96.21 |

OTHER PUBLICATIONS

M. A. Bedgood, J. Leach, M. Matthews, "Demountable Connectors for Optical Fiber Systems", Electrical Comm., vol. 51, No. 2, Feb. 76, pp. 85-91.

Primary Examiner—Rolf G. Hille
Attorney, Agent, or Firm—Thomas L. Peterson

[57] ABSTRACT

An optical fiber connector in which each mating fiber is provided with a termination in the form of a cast metal sleeve fitted in a metal ferrule.

4 Claims, 2 Drawing Figures

U.S. Patent  Sep. 4, 1979  4,166,672

OPTICAL FIBER CONNECTOR

BACKGROUND OF THE INVENTION

The present invention relates generally to arrangements for coupling optical fibers and, in particular, to an optical fiber connector member or termination employing a fusible metal slug having an elongated bore for receiving the bared fiber end.

Copending application of John Lees et al, entitled, "Optical Fiber Joining", Ser. No. 679,641, filed Apr. 23, 1976, describes an optical fiber connector including a pair of optical fibers whose ends are butted together within the straight parallel sided bore of a cast Wood's metal sleeve. The diameter of the bore in the sleeve is such as to hold the fiber ends in alignment with each other.

SUMMARY OF THE INVENTION

According to one aspect of the present invention, there is provided an optical fiber termination adapted to be fitted to the stripped end of a plastic clad fiber. The termination comprises a tubular housing. First and second cylindrical plastic inserts are mounted end-to-end in the housing and each carries a respective sleeve member. The sleeve members have a sliding fit on the plastic cladding of the fiber. The forward sleeve member contains a fusible metal insert having an elongated bore for receiving the bared end of the fiber.

According to another aspect of the present invention, there is provided an optical connector assembly for coupling first and second optical fibers including first and second fiber termination members, each of which has a tubular housing containing an axially mounted sleeve member having a bored fusible metal insert therein for receiving a said fiber end. A coupling member is provided having a first outer sleeve for receiving the tubular housings of the terminations and an axially mounted inner sleeve in which the termination sleeve members meet in abutment and axial alignment.

DESCRIPTION OF THE PREFERRED EMBODIMENT

Figure 1:
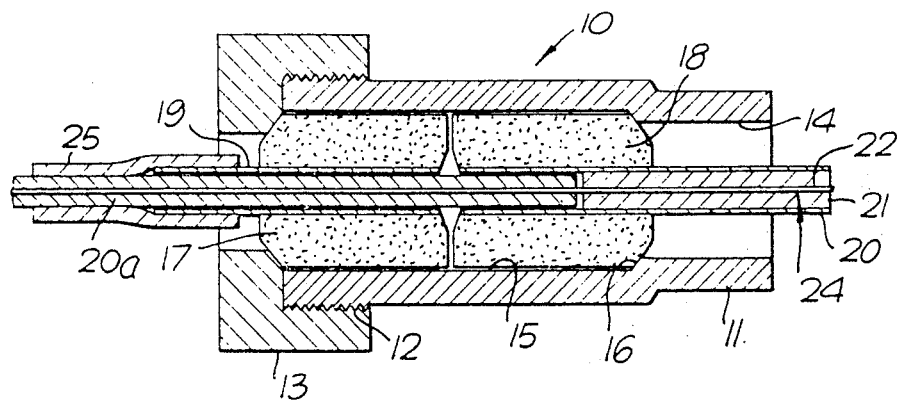
FIG. 1 is a longitudinal section of the optical fiber termination of the present invention.

Referring to FIG. 1, the optical fiber termination 10 includes a metal tube member 11 having a screw thread 12 at one end for receiving a gland nut 13. The tube member 11 has a forward bore 14 and a rearward enlarged bore 15 separated by an annular shoulder 16. The rearward bore 15 receives first and second cylindrical plastic inserts 17 and 18, respectively. Each insert has an axial bore in which an elongated cylindrical metal; e.g., brass, sleeve, 19 and 20, respectively, is mounted. Each sleeve member has an internal diameter such that a plastic clad optical fiber 20a has a sliding fit in the sleeve.

The second or forward sleeve 20 is provided with a fusible metal; e.g. Wood's metal, insert or slug 21 having an axial bore 22 for receiving and locating the bared fiber end 24. The metal slug 21 may be prepared as described in the aforementioned copending application by casting the slug about a wire having a precise diameter and removing the wire to form a bore dimensioned to slidably receive the bared fiber.

The connector member of termination is fitted to the plastic clad fiber by the following procedure. The end of the clad fiber is stripped of its plastic cladding to expose the bare fiber end 24 for a distance corresponding to the length of the metal slug 21. The gland nut 13 is slid over the end of the fiber followed by the first and second plastic inserts 17 and 18 with their sleeves 19 and 20, such that the fiber end 24 enters the bore 22 of the metal slug 21. The assembly is then inserted in the larger rearward bore of the tube member 11 and the gland nut 13 is tightened forcing the second plastic insert 18 into abutment with the shoulder 16. The joint between the optical fiber and the rearward sleeve 19 may advantageously be protected with a short length of heat shrinkable plastic tubing 25.

Figure 2:
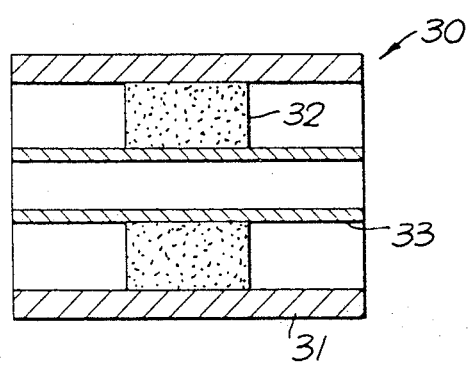
FIG. 2 is a longitudinal section of a coupling member for coupling and aligning a pair of terminations of the type shown in FIG. 1.

FIG. 2 shows a coupling member 30 for connecting a pair of terminations 10 of the type shown in FIG. 1. A metal tube 31 is fitted with a plastic insert 32 which insert carries a metal sleeve 33 coaxial with the tube 31. The sleeve 33 is of such a size as to have a sliding fit on the sleeve 20 of the termination 10 of FIG. 1. In use, the coupling member is positioned between a pair of terminations each of which is arranged with its forward sleeve 20 inserted in the sleeve 33 such that the two fiber ends abut in the center of the sleeve 33. The plastic insert 32 is dimensioned such that the tube members 11 both abut the insert 32 when their respective fiber ends are in abutment thus preventing damage to the fibers from excessive insertion force.

In some applications, a small quantity of refractive index matching fluid may be placed between two fiber ends to enhance coupling between the fibers.

It is to be understood that the foregoing description of specific examples of this invention is made by way of example only and is not to be considered as a limitation on its scope.

What is claimed is:

1. An optical fiber termination adapted to be fitted to the stripped end of a single plastic clad fiber comprising:
   a tubular housing having a forward end;
   first and second cylindrical plastic inserts mounted end-to-end in said housing spaced behind said forward end and each carrying a respective sleeve member;
   said sleeve members being coaxial and adapted to have a sliding fit on the plastic cladding on the fiber; and
   one said sleeve member having a fusible metal insert formed with an elongated bore dimensioned to slidably receive the bared end of the fiber.

2. A termination as set forth in claim 1 wherein:
   said metal insert is a Wood's metal casting.

3. A termination as set forth in claim 1 wherein:
   said housing has an inwardly directed annular shoulder against which one of said plastic inserts abuts; and
   a gland nut is fitted to said housing for pushing said inserts toward said shoulders.

4. An optical connector assembly for coupling first and second single optical fibers comprising:
   first and second fiber termination members each of which has a tubular housing with forward and rear ends and containing an axially mounted fixed sleeve member, said sleeve member being spaced from said tubular housing to provide an annular space therebetween open at said forward end, a fusible metal insert in said sleeve member formed with an elongated bore dimensioned to slidably receive a fiber end; and a coupling member having an outer sleeve and an axially mounted, rigid inner sleeve in which said termination sleeve members slidably meet in abutment and axial alignment, said inner sleeve being spaced from said outer sleeve to provide an annular space open at the opposite ends of said coupling member dimensioned to slidably receive in its opposite ends said tubular housings of said terminations.

* * * * *